US012205518B2

(12) United States Patent
Kim et al.

(10) Patent No.: US 12,205,518 B2
(45) Date of Patent: Jan. 21, 2025

(54) POWER VOLTAGE GENERATOR, DRIVER IC, AND DISPLAY DEVICE

(71) Applicant: Samsung Display Co., Ltd., Yongin-Si (KR)

(72) Inventors: Hyunchang Kim, Yongin-si (KR); Se-Byung Chae, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/376,468

(22) Filed: Oct. 4, 2023

(65) Prior Publication Data

US 2024/0177648 A1 May 30, 2024

(30) Foreign Application Priority Data

Nov. 30, 2022 (KR) ........................ 10-2022-0164314

(51) Int. Cl.

*G09G 3/30* (2006.01)
*G05F 1/46* (2006.01)
*G09G 3/20* (2006.01)

(52) U.S. Cl.

CPC ............. *G09G 3/2096* (2013.01); *G05F 1/46* (2013.01); *G09G 3/20* (2013.01); *G09G 2310/0291* (2013.01); *G09G 2320/0673* (2013.01); *G09G 2330/028* (2013.01)

(58) Field of Classification Search

None

See application file for complete search history.

(56) References Cited

U.S. PATENT DOCUMENTS

| | | | | |
|---|---|---|---|---|
| 7,791,319 | B2 | 9/2010 | Veselic et al. | |
| 8,581,897 | B2 | 11/2013 | Park | |
| 10,083,671 | B2 | 9/2018 | Lee et al. | |
| 10,134,333 | B2 | 11/2018 | Park | |
| 2011/0050670 | A1* | 3/2011 | Kim | G06F 1/30 323/304 |
| 2011/0057913 | A1* | 3/2011 | Chung | G09G 3/3291 345/211 |
| 2016/0027381 | A1 | 1/2016 | Ryu et al. | |
| 2022/0199005 | A1* | 6/2022 | Kim | G09G 3/3208 |

FOREIGN PATENT DOCUMENTS

| | | | |
|---|---|---|---|
| KR | 10-1052582 | B1 | 7/2011 |
| KR | 10-2011-0095592 | A | 8/2011 |
| KR | 10-2016-0014135 | A | 2/2016 |
| KR | 10-2016-0048314 | A | 5/2016 |
| KR | 10-2017-0017035 | A | 2/2017 |

* cited by examiner

*Primary Examiner* — Joseph R Haley

(74) *Attorney, Agent, or Firm* — Innovation Counsel LLP

(57) ABSTRACT

A power voltage generator includes an analog reference voltage generator configured to generate an analog reference voltage based on a first input voltage, a resistance string configured to generate distribution voltages by performing voltage distribution on the analog reference voltage, a decoding unit configured to generate reference voltages by decoding the distribution voltages, and a regulator unit configured to generate driving voltages based on the reference voltages.

20 Claims, 7 Drawing Sheets

POWER VOLTAGE GENERATOR, DRIVER IC, AND DISPLAY DEVICE

CROSS-REFERENCE TO RELATED APPLICATION

This application claims priority under 35 USC § 119 to Korean Patent Application No. 10-2022-0164314 filed on Nov. 30, 2022, in the Korean Intellectual Property Office (KIPO), the entire disclosure of which is incorporated herein by reference.

BACKGROUND

1. Field

Embodiments of the present disclosure relate to a power voltage generator, a driver IC, and a display device. More particularly, embodiments of the present disclosure relate to a power voltage generator that generates driving voltages, a driver integrated circuit (IC) including the power voltage generator, and a display device including the power voltage generator.

2. Description of the Related Art

In general, a display device may include a display panel, a gate driver, a data driver, and a timing controller. The display panel may include a plurality of gate lines, a plurality of data lines, and a plurality of pixels electrically connected to the gate lines and the data lines. The gate driver may provide gate signals to the gate lines, the data driver may provide data voltages to the data lines, and the timing controller may control the gate driver and the data driver.

The display device may include a power voltage generator configured to generate driving voltages for driving components of the display device. In addition, when noise is generated in a ground to which components of the power voltage generator are connected, noise may be generated in the driving voltages. In this case, the noise may be transmitted to the components of the display device, which are configured to receive the driving voltages from the power voltage generator, and flicker may be caused by the noise.

SUMMARY

One object of the present disclosure is to provide a power voltage generator that generates an analog reference voltage based on an input voltage for driving other components.

Another object of the present disclosure is to provide a driver IC including the power voltage generator.

Still another object of the present disclosure is to provide a display device including the power voltage generator.

However, the object of the present disclosure is not limited thereto. Thus, the object of the present disclosure may be extended without departing from the spirit and the scope of the present disclosure.

According to embodiments, a power voltage generator may include an analog reference voltage generator configured to generate an analog reference voltage based on a first input voltage, a resistance string configured to generate distribution voltages by performing voltage distribution on the analog reference voltage, a decoding unit configured to generate reference voltages by decoding the distribution voltages, and a regulator unit configured to generate driving voltages based on the reference voltages.

In an embodiment, the analog reference voltage generator may include a first bandgap reference voltage generator configured to receive the first input voltage to generate a first bandgap reference voltage, a first amplifier including a first input terminal configured to receive the first bandgap reference voltage, a second input terminal connected to a first node, and an output terminal configured to output a preliminary analog reference voltage, a first resistance element including a first electrode connected to a ground and a second electrode connected to the first node, a second resistance element including a first electrode connected to the first node and a second electrode connected to the output terminal of the first amplifier, a second bandgap reference voltage generator configured to receive the preliminary analog reference voltage to generate a second bandgap reference voltage, a second amplifier including a first input terminal configured to receive the second bandgap reference voltage, a second input terminal connected to a second node, and an output terminal configured to output the analog reference voltage, a third resistance element including a first electrode connected to the ground and a second electrode connected to the second node, and a fourth resistance element including a first electrode connected to the second node and a second electrode connected to the output terminal of the second amplifier.

In an embodiment, the first amplifier may further include a power terminal configured to receive the first input voltage.

In an embodiment, the second amplifier may further include a power terminal configured to receive the preliminary analog reference voltage.

In an embodiment, the analog reference voltage generator may be configured to generate the analog reference voltage based on the first input voltage and a second input voltage that is smaller than the first input voltage.

In an embodiment, the analog reference voltage generator may include a first bandgap reference voltage generator configured to receive the second input voltage to generate a first bandgap reference voltage, a first amplifier including a first input terminal configured to receive the first bandgap reference voltage, a second input terminal connected to a first node, an output terminal configured to output a preliminary analog reference voltage, and a power terminal configured to receive the first input voltage, a first resistance element including a first electrode connected to a ground and a second electrode connected to the first node, a second resistance element including a first electrode connected to the first node and a second electrode connected to the output terminal of the first amplifier, a second bandgap reference voltage generator configured to receive the preliminary analog reference voltage to generate a second bandgap reference voltage, a second amplifier including a first input terminal configured to receive the second bandgap reference voltage, a second input terminal connected to a second node, and an output terminal configured to output the analog reference voltage, a third resistance element including a first electrode connected to the ground and a second electrode connected to the second node, and a fourth resistance element including a first electrode connected to the second node and a second electrode connected to the output terminal of the second amplifier.

In an embodiment, the second amplifier may further include a power terminal configured to receive the preliminary analog reference voltage.

According to embodiments, a driver integrated circuit (IC) may include a power voltage generator configured to generate driving voltages, a gamma reference voltage generator configured to receive at least one of the driving voltages to generate a gamma reference voltage, and a data driver configured to generate data voltages based on the gamma reference voltage. Here, the power voltage generator may include an analog reference voltage generator configured to generate an analog reference voltage based on a first input voltage for driving at least one of the data driver and the gamma reference voltage generator, a resistance string configured to generate distribution voltages by performing voltage distribution on the analog reference voltage, a decoding unit configured to generate reference voltages by decoding the distribution voltages, and a regulator unit configured to generate the driving voltages based on the reference voltages.

In an embodiment, the analog reference voltage generator may include a first bandgap reference voltage generator configured to receive the first input voltage to generate a first bandgap reference voltage, a first amplifier including a first input terminal configured to receive the first bandgap reference voltage, a second input terminal connected to a first node, and an output terminal configured to output a preliminary analog reference voltage, a first resistance element including a first electrode connected to a ground and a second electrode connected to the first node, a second resistance element including a first electrode connected to the first node and a second electrode connected to the output terminal of the first amplifier, a second bandgap reference voltage generator configured to receive the preliminary analog reference voltage to generate a second bandgap reference voltage, a second amplifier including a first input terminal configured to receive the second bandgap reference voltage, a second input terminal connected to a second node, and an output terminal configured to output the analog reference voltage, a third resistance element including a first electrode connected to the ground and a second electrode connected to the second node, and a fourth resistance element including a first electrode connected to the second node and a second electrode connected to the output terminal of the second amplifier.

In an embodiment, the first amplifier may further include a power terminal configured to receive the first input voltage. In addition, the second amplifier may further include a power terminal configured to receive the preliminary analog reference voltage.

In an embodiment, the analog reference voltage generator may be configured to generate the analog reference voltage based on the first input voltage and a second input voltage that is smaller than the first input voltage.

In an embodiment, the analog reference voltage generator may include a first bandgap reference voltage generator configured to receive the second input voltage to generate a first bandgap reference voltage, a first amplifier including a first input terminal configured to receive the first bandgap reference voltage, a second input terminal connected to a first node, an output terminal configured to output a preliminary analog reference voltage, and a power terminal configured to receive the first input voltage, a first resistance element including a first electrode connected to a ground and a second electrode connected to the first node, a second resistance element including a first electrode connected to the first node and a second electrode connected to the output terminal of the first amplifier, a second bandgap reference voltage generator configured to receive the preliminary analog reference voltage to generate a second bandgap reference voltage, a second amplifier including a first input terminal configured to receive the second bandgap reference voltage, a second input terminal connected to a second node, and an output terminal configured to output the analog reference voltage, a third resistance element including a first electrode connected to the ground and a second electrode connected to the second node, and a fourth resistance element including a first electrode connected to the second node and a second electrode connected to the output terminal of the second amplifier.

In an embodiment, the driver IC may further include a timing controller configured to control the data driver and the gamma reference voltage generator.

According to embodiments, a display device may include a display panel including pixels to which at least one of driving voltages is input, a gate driver configured to apply gate signals to the pixels, and a driver integrated circuit (IC) configured to generate the driving voltages and to apply data voltages to the pixels. Here, the driver IC may include a power voltage generator configured to generate the driving voltages, a gamma reference voltage generator configured to generate a gamma reference voltage, and a data driver configured to generate the data voltages based on the gamma reference voltage. In addition, the power voltage generator may include an analog reference voltage generator configured to generate an analog reference voltage based on a first input voltage for driving at least one of the data driver and the gamma reference voltage generator, a resistance string configured to generate distribution voltages by performing voltage distribution on the analog reference voltage, a decoding unit configured to generate reference voltages by decoding the distribution voltages, and a regulator unit configured to generate the driving voltages based on the reference voltages.

In an embodiment, the gate driver may be configured to receive at least one of the driving voltages to generate the gate signals.

In an embodiment, the analog reference voltage generator may include a first bandgap reference voltage generator configured to receive the first input voltage to generate a first bandgap reference voltage, a first amplifier including a first input terminal configured to receive the first bandgap reference voltage, a second input terminal connected to a first node, and an output terminal configured to output a preliminary analog reference voltage, a first resistance element including a first electrode connected to a ground and a second electrode connected to the first node, a second resistance element including a first electrode connected to the first node and a second electrode connected to the output terminal of the first amplifier, a second bandgap reference voltage generator configured to receive the preliminary analog reference voltage to generate a second bandgap reference voltage, a second amplifier including a first input terminal configured to receive the second bandgap reference voltage, a second input terminal connected to a second node, and an output terminal configured to output the analog reference voltage, a third resistance element including a first electrode connected to the ground and a second electrode connected to the second node, and a fourth resistance element including a first electrode connected to the second node and a second electrode connected to the output terminal of the second amplifier.

In an embodiment, the analog reference voltage generator may be configured to generate the analog reference voltage based on the first input voltage and a second input voltage that is smaller than the first input voltage.

In an embodiment, the analog reference voltage generator may include a first bandgap reference voltage generator configured to receive the second input voltage to generate a first bandgap reference voltage, a first amplifier including a first input terminal configured to receive the first bandgap reference voltage, a second input terminal connected to a first node, an output terminal configured to output a preliminary analog reference voltage, and a power terminal configured to receive the first input voltage, a first resistance element including a first electrode connected to a ground and a second electrode connected to the first node, a second resistance element including a first electrode connected to the first node and a second electrode connected to the output terminal of the first amplifier, a second bandgap reference voltage generator configured to receive the preliminary analog reference voltage to generate a second bandgap reference voltage, a second amplifier including a first input terminal configured to receive the second bandgap reference voltage, a second input terminal connected to a second node, and an output terminal configured to output the analog reference voltage, a third resistance element including a first electrode connected to the ground and a second electrode connected to the second node, and a fourth resistance element including a first electrode connected to the second node and a second electrode connected to the output terminal of the second amplifier.

In an embodiment, the display device may further include a timing controller configured to control the gate driver, the data driver, and the gamma reference voltage generator.

In an embodiment, the timing controller may be integrated into the driver IC.

Therefore, a power voltage generator according to embodiments may generate an analog reference voltage based on an input voltage having a high voltage level for driving a specific component (e.g., a decoding unit, a regulator unit, a data driver, a gamma reference voltage generator, a pixel, a gate driver, etc.), so that reference voltages having higher voltage levels than a conventional display device can be generated. Accordingly, the power voltage generator may increase voltage levels of reference voltages applied to regulators and reduce voltage gains of the regulators, so that an influence of noise on outputs of the regulators can be reduced.

However, the effects of the present disclosure are not limited thereto. Thus, the effects of the present disclosure may be extended without departing from the spirit and the scope of the present disclosure.

DETAILED DESCRIPTION OF THE EMBODIMENTS

Hereinafter, embodiments of the present disclosure will be explained in detail with reference to the accompanying drawings.

Figure 1:
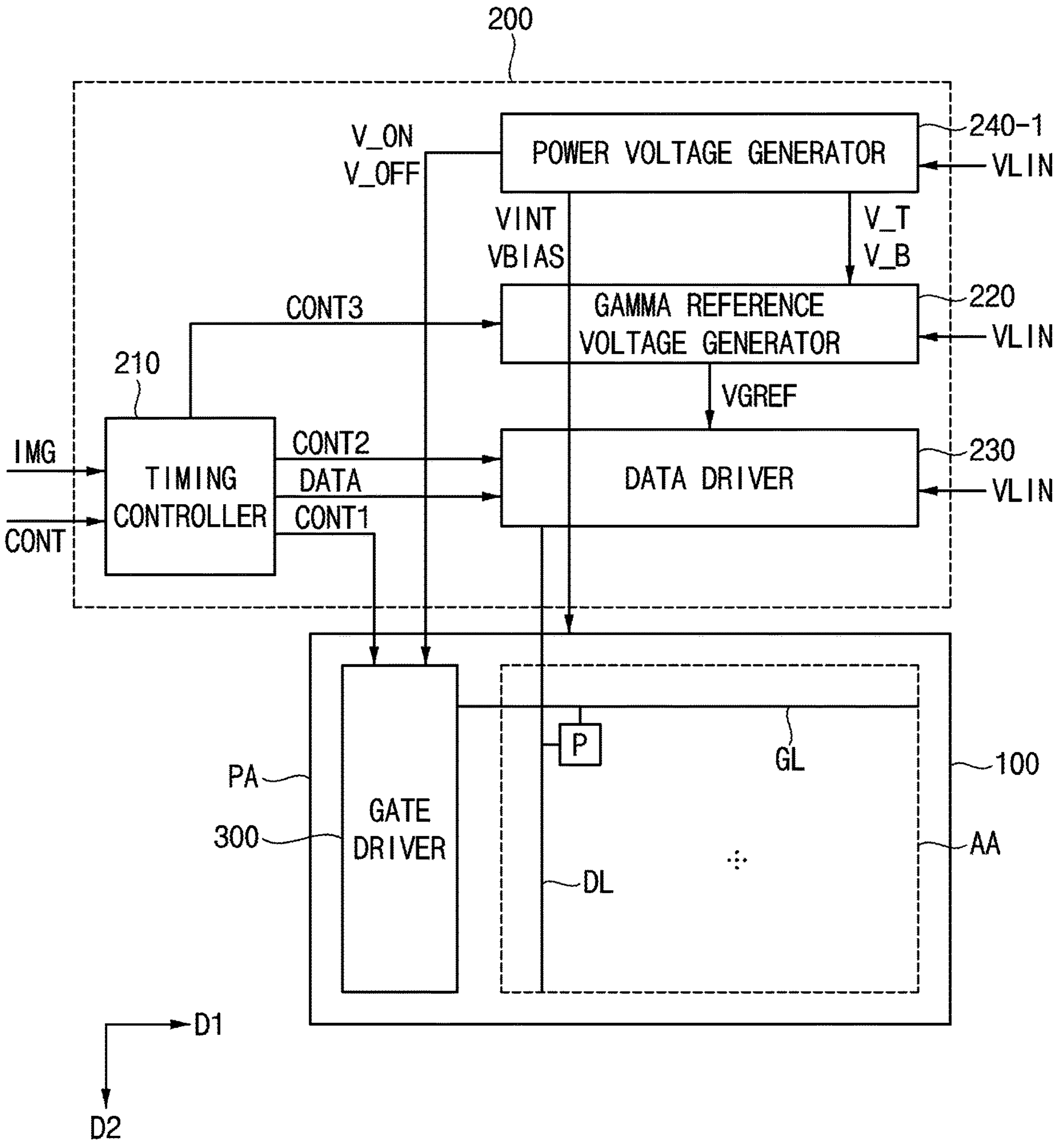
FIG. 1 is a block diagram showing a display device according to embodiments of the present disclosure.

FIG. 1 is a block diagram showing a display device according to embodiments of the present disclosure.

Referring to FIG. 1, a display device may include a display panel 100 and a driver IC 200. The driver IC 200 may include a timing controller 210, a gamma reference voltage generator 220, a data driver 230, and a power voltage generator 240-1.

Although the timing controller 210 and the power voltage generator 240-1 have been illustrated in the present embodiment as being integrated into the driver IC 200, the present disclosure is not limited thereto. For example, the timing controller 210 may be configured as a separate IC without being integrated into the driver IC 200. For example, the power voltage generator 240-1 may be configured as a separate IC without being integrated into the driver IC 200.

The display panel 100 may include a display area AA configured to display an image, and a peripheral area PA that is adjacent to the display area AA. According to one embodiment, the gate driver 300 may be mounted on the peripheral area PA.

The display panel 100 may include a plurality of gate lines GL, a plurality of data lines DL, and a plurality of pixels P electrically connected to the gate lines GL and the data lines DL. The gate lines GL may extend in a first direction D1, and the data lines DL may extend in a second direction D2 intersecting the first direction D1.

The timing controller 210 may receive input image data IMG and an input control signal CONT from a main processor (e.g., a graphic processing unit (GPU), etc.). For example, the input image data IMG may include red image data, green image data, and blue image data. According to one embodiment, the input image data IMG may further include white image data. As another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The timing controller 210 may generate a first control signal CONT1, a second control signal CONT2, a third control signal CONT3, and a data signal DATA based on the input image data IMG and the input control signal CONT.

The timing controller 210 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The timing controller 210 may generate the second control signal CONT2 for controlling an operation of the data driver 230 based on the input control signal CONT to output the generated second control signal CONT2 to the data driver 230. The second control signal CONT2 may include a horizontal start signal and a load signal.

The timing controller 210 may generate the third control signal CONT3 for controlling an operation of the gamma reference voltage generator 220 based on the input control signal CONT to output the generated third control signal CONT3 to the gamma reference voltage generator 220.

The timing controller 210 may receive the input image data IMG and the input control signal CONT to generate the data signal DATA. The timing controller 210 may output the data signal DATA to the data driver 230.

The gate driver 300 may generate gate signals for driving the gate lines GL in response to the first control signal CONT1 received from the timing controller 210. The gate driver 300 may output the gate signals to the gate lines GL. For example, the gate driver 300 may sequentially output the gate signals to the gate lines GL.

The gamma reference voltage generator 220 may generate a gamma reference voltage VGREF in response to the third control signal CONT3 received from the timing controller 210. The gamma reference voltage generator 220 may provide the gamma reference voltage VGREF to the data driver 230. The gamma reference voltage VGREF may have a value corresponding to each data signal DATA. According to one embodiment, the gamma reference voltage generator 220 may be integrated into the timing controller 210. According to one embodiment, the gamma reference voltage generator 220 may be integrated into the data driver 230.

The data driver 230 may receive the second control signal CONT2 and the data signal DATA from the timing controller 210, and receive the gamma reference voltage VGREF from the gamma reference voltage generator 220. The data driver 230 may generate data voltages obtained by converting the data signal DATA into analog voltages by using the gamma reference voltage VGREF. The data driver 230 may output the data voltages to the data lines DL.

The gamma reference voltage generator 220, the data driver 230, and the power voltage generator 240-1 may receive a first input voltage VLIN. The first input voltage VLIN may be a power voltage for driving the gamma reference voltage generator 220, the data driver 230, and the power voltage generator 240-1. According to one embodiment, the first input voltage VLIN may be generated from a power supply (see FIG. 7). For example, the power supply may include a power management integrated circuit (PMIC).

The power voltage generator 240-1 will be described in detail below.

Figure 2:
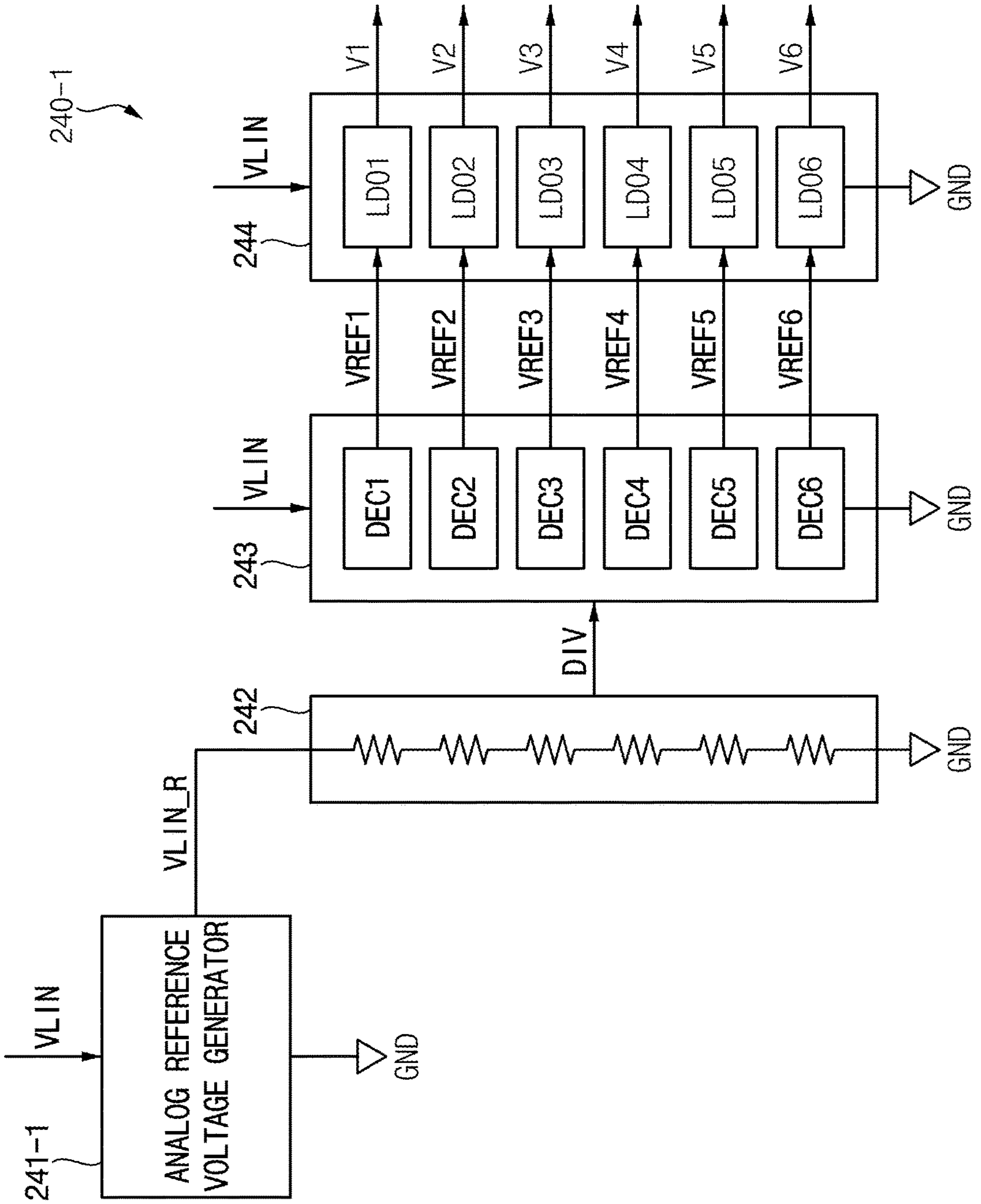
FIG. 2 is a view showing one example of a power voltage generator of FIG. 1.

FIG. 2 is a view showing one example of a power voltage generator 240-1 of FIG. 1.

Referring to FIGS. 1 and 2, the power voltage generator 240-1 may include: an analog reference voltage generator 241-1 configured to generate an analog reference voltage VLIN_R based on a first input voltage VLIN; a resistance string 242 configured to generate distribution voltages DIV by performing voltage distribution on the analog reference voltage VLIN_R; a decoding unit 243 configured to generate reference voltages VREF1, VREF2, VREF3, VREF4, VREF5, and VREF6 by decoding the distribution voltages DIV; and a regulator unit 244 configured to generate driving voltages V1, V2, V3, V4, V5, and V6 based on the reference voltages VREF1, VREF2, VREF3, VREF4, VREF5, and VREF6.

The decoding unit 243 and the regulator unit 244 may receive the first input voltage VLIN. The first input voltage VLIN may be a power voltage for driving the plurality of decoding unit 243 and the regulator unit 244. According to one embodiment, the first input voltage VLIN may be generated from the power supply.

The analog reference voltage generator 241-1 may generate the analog reference voltage VLIN_R based on the first input voltage VLIN. The analog reference voltage generator 241-1 will be described in detail below.

The resistance string 242 may include a plurality of resistance elements. The resistance elements may be connected in series. The resistance string 242 may generate a voltage (i.e., the distribution voltage DIV) having a voltage level between the analog reference voltage VLIN_R and a ground GND by performing the voltage distribution on the analog reference voltage VLIN_R.

The decoding unit 243 may include a plurality of decoders DEC1, DEC2, DEC3, DEC4, DEC5, and DEC6. The decoders DEC1, DEC2, DEC3, DEC4, DEC5, and DEC6 may receive the distribution voltages DIV which correspond to voltage levels of the reference voltages VREF1, VREF2, VREF3, VREF4, VREF5, and VREF6 that are to be generated, respectively.

The regulator unit 244 may include a plurality of regulators LDO1, LDO2, LDO3, LDO4, LDO5, and LDO6 which are connected to the decoders DEC1, DEC2, DEC3, DEC4, DEC5, and DEC6, respectively. The regulators LDO1, LDO2, LDO3, LDO4, LDO5, and LDO6 may generate the driving voltages V1, V2, V3, V4, V5, and V6 by adjusting the voltage levels of the reference voltages VREF1, VREF2, VREF3, VREF4, VREF5, and VREF6, respectively.

According to one embodiment, each of the regulators LDO1, LDO2, LDO3, LDO4, LDO5, and LDO6 may be a low dropout (LDO) regulator. For example, the regulators LDO1, LDO2, LDO3, LDO4, LDO5, and LDO6 may generate the driving voltages V1, V2, V3, V4, V5, and V6 by reducing the voltage levels of the reference voltages VREF1, VREF2, VREF3, VREF4, VREF5, and VREF6, respectively.

Although each of the number of the decoders DEC1, DEC2, DEC3, DEC4, DEC5, and DEC6 and the number of the regulators LDO1, LDO2, LDO3, LDO4, LDO5, and LDO6 has been illustrated in the present embodiment as being six, the present disclosure is not limited to the numbers of the decoders DEC1, DEC2, DEC3, DEC4, DEC5, and DEC6 and the regulators LDO1, LDO2, LDO3, LDO4, LDO5, and LDO6.

According to one embodiment, the gamma reference voltage generator 220 may receive at least one of the driving voltages V1, V2, V3, V4, V5, and V6 to generate the gamma reference voltage VGREF.

For example, one of the driving voltages V1, V2, V3, V4, V5, and V6 may be a top gamma reference voltage V_T. For example, one of the driving voltages V1, V2, V3, V4, V5, and V6 may be a bottom gamma reference voltage V_B.

The gamma reference voltage generator 220 may receive the top gamma reference voltage V_T and the bottom gamma reference voltage V_B. The gamma reference voltage generator 220 may generate the gamma reference voltage VGREF based on the top gamma reference voltage V_T and the bottom gamma reference voltage V_B. For example, the gamma reference voltage generator 220 may generate a voltage (i.e., the gamma reference voltage VGREF) having a voltage level between the top gamma reference voltage V_T and the bottom gamma reference voltage V_B by performing voltage distribution on the top gamma reference voltage V_T and the bottom gamma reference voltage V_B.

According to one embodiment, the gate driver 300 may receive at least one of the driving voltages V1, V2, V3, V4, V5, and V6 to generate the gate signals.

For example, one of the driving voltages V1, V2, V3, V4, V5, and V6 may be a gate-on voltage V_ON. For example, one of the driving voltages V1, V2, V3, V4, V5, and V6 may be a gate-off voltage V_OFF.

The gate driver 300 may receive the gate-on voltage V_ON and the gate-off voltage V_OFF. The gate driver 300 may generate the gate signals based on the gate-on voltage V_ON and the gate-off voltage V_OFF. For example, each of the gate signals having an activation level may have a voltage level of the gate-on voltage V_ON. For example, each of the gate signals having an inactivation level may have a voltage level of the gate-off voltage V_OFF.

According to one embodiment, the pixels P may receive at least one of the driving voltages V1, V2, V3, V4, V5, and V6.

For example, one of the driving voltages V1, V2, V3, V4, V5, and V6 may be an initialization voltage VINT. For example, one of the driving voltages V1, V2, V3, V4, V5, and V6 may be a bias voltage VBIAS.

The pixels P may receive the initialization voltage VINT and the bias voltage VBIAS. For example, the pixels P may receive the initialization voltage VINT to initialize a written data voltage or a light emitting element. For example, the pixels P may receive the bias voltage VBIAS to initialize a bias of a driving transistor.

Figure 3:
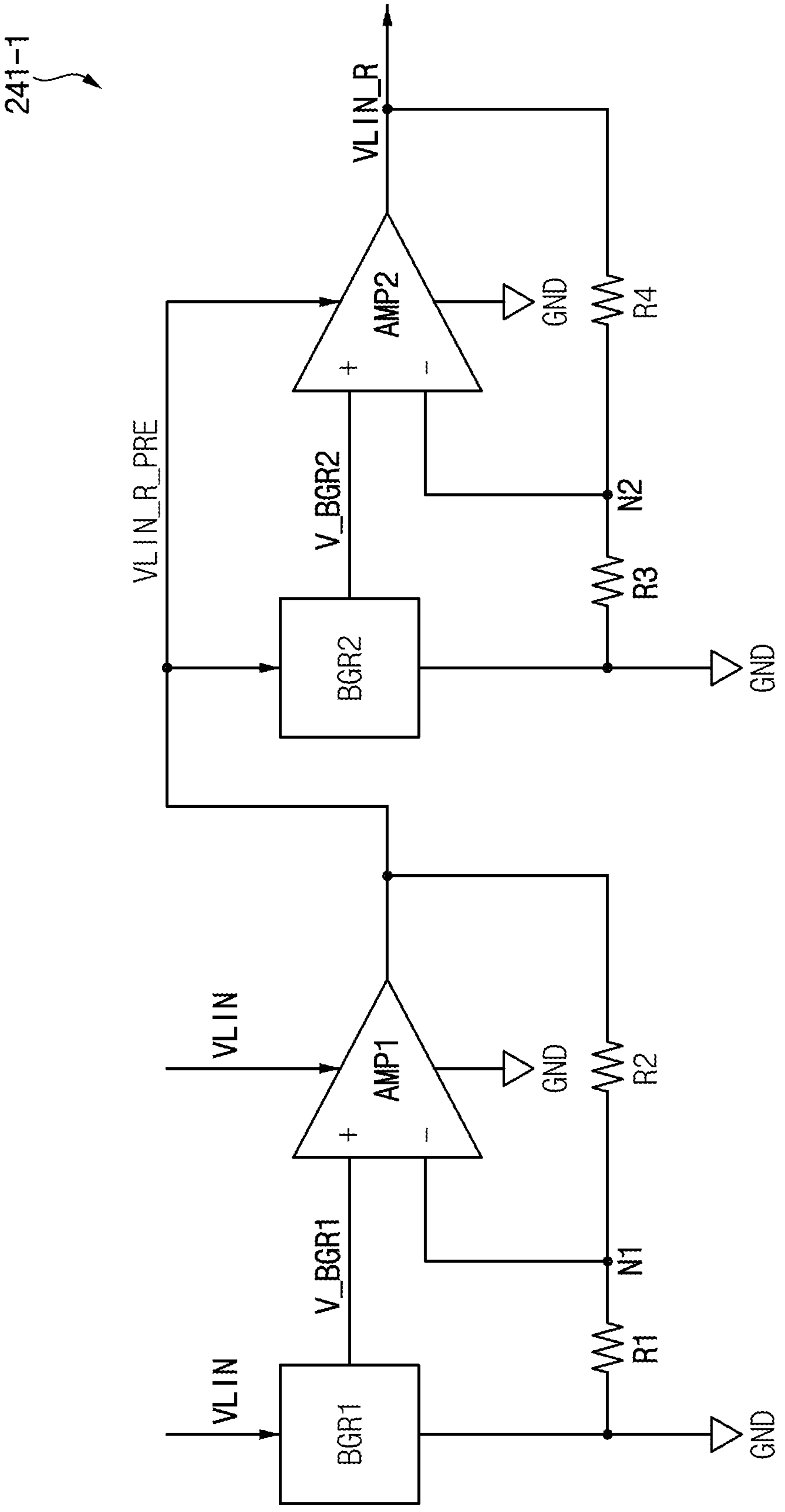
FIG. 3 is a view showing one example of an analog reference voltage generator of FIG. 2.

FIG. 3 is a view showing one example of an analog reference voltage generator 241-1 of FIG. 2.

Referring to FIGS. 1 to 3, the analog reference voltage generator 241-1 may include: a first bandgap reference voltage generator BGR1 configured to receive the first input voltage VLIN to generate a first bandgap reference voltage V_BGR1; a first amplifier AMP1 including a first input terminal configured to receive the first bandgap reference voltage V_BGR1, a second input terminal connected to a first node N1, and an output terminal configured to output a preliminary analog reference voltage VLIN_R_PRE; a first resistance element R1 including a first electrode connected to a ground GND and a second electrode connected to the first node N1; a second resistance element R2 including a first electrode connected to the first node N1 and a second electrode connected to the output terminal of the first amplifier AMP1; a second bandgap reference voltage generator BGR2 configured to receive the preliminary analog reference voltage VLIN_R_PRE to generate a second bandgap reference voltage V_BGR2; a second amplifier AMP2 including a first input terminal configured to receive the second bandgap reference voltage V_BGR2, a second input terminal connected to a second node N2, and an output terminal configured to output the analog reference voltage VLIN_R; a third resistance element R3 including a first electrode connected to the ground GND and a second electrode connected to the second node N2; and a fourth resistance element R4 including a first electrode connected to the second node N2 and a second electrode connected to the output terminal of the second amplifier AMP2.

The first and second bandgap reference voltage generators BGR1 and BGR2 may be bandgap reference voltage circuits. The bandgap reference voltage circuit may be a circuit having a predetermined voltage output with respect to a temperature. For example, the first bandgap reference voltage V_BGR1 and the second bandgap reference voltage V_BGR2 may have predetermined voltage levels with respect to a temperature.

The first bandgap reference voltage V_BGR1 may be a voltage corresponding to the first input voltage VLIN. A voltage of the first node N1 may be a voltage corresponding to the first bandgap reference voltage V_BGR1. In addition, the preliminary analog reference voltage VLIN_R_PRE may be determined by the first bandgap reference voltage V_BGR1 and resistances of the first and second resistance elements R1 and R2.

The first amplifier AMP1 may further include a power terminal configured to receive the first input voltage VLIN. Therefore, the preliminary analog reference voltage VLIN_R_PRE may be less than or equal to the first input voltage VLIN.

The second bandgap reference voltage V_BGR2 may be a voltage corresponding to the preliminary analog reference voltage VLIN_R_PRE. A voltage of the second node N2 may be a voltage corresponding to the second bandgap reference voltage V_BGR2. In addition, the analog reference voltage VLIN_R may be determined by the second bandgap reference voltage V_BGR2 and resistances of the third and fourth resistance elements R3 and R4.

The second amplifier AMP2 may further include a power terminal configured to receive the preliminary analog reference voltage VLIN_R_PRE. Therefore, the analog reference voltage VLIN_R may be less than or equal to the preliminary analog reference voltage VLIN_R_PRE.

The analog reference voltage VLIN_R may have a higher voltage level in a case where an input voltage (e.g., the first input voltage VLIN) having a high voltage level (e.g., 7.3 V) is applied to the power terminal of the first amplifier AMP1 as compared with a case where an input voltage (e.g., a second input voltage (VCI of FIG. 5) that will be described below) having a low voltage level (e.g., 3 V) is applied to the power terminal of the first amplifier AMP1. Since the analog reference voltage VLIN_R has a high voltage level, the reference voltages VREF1, VREF2, VREF3, VREF4, VREF5, and VREF6 may also have high voltage levels. In addition, since the driving voltages V1, V2, V3, V4, V5, and V6 that are required are not changed, voltage gains of the regulators LDO1, LDO2, LDO3, LDO4, LDO5, and LDO6 may be reduced. Therefore, the power voltage generator 240-1 may increase the voltage levels of the reference voltages VREF1, VREF2, VREF3, VREF4, VREF5, and VREF6 applied to the regulators LDO1, LDO2, LDO3, LDO4, LDO5, and LDO6 and reduce the voltage gains of the regulators LDO1, LDO2, LDO3, LDO4, LDO5, and LDO6, so that an influence of noise on outputs of the regulators LDO1, LDO2, LDO3, LDO4, LDO5, and LDO6 may be reduced. In other words, noise characteristics of the regulators LDO1, LDO2, LDO3, LDO4, LDO5, and LDO6 may be improved.

Figure 4:
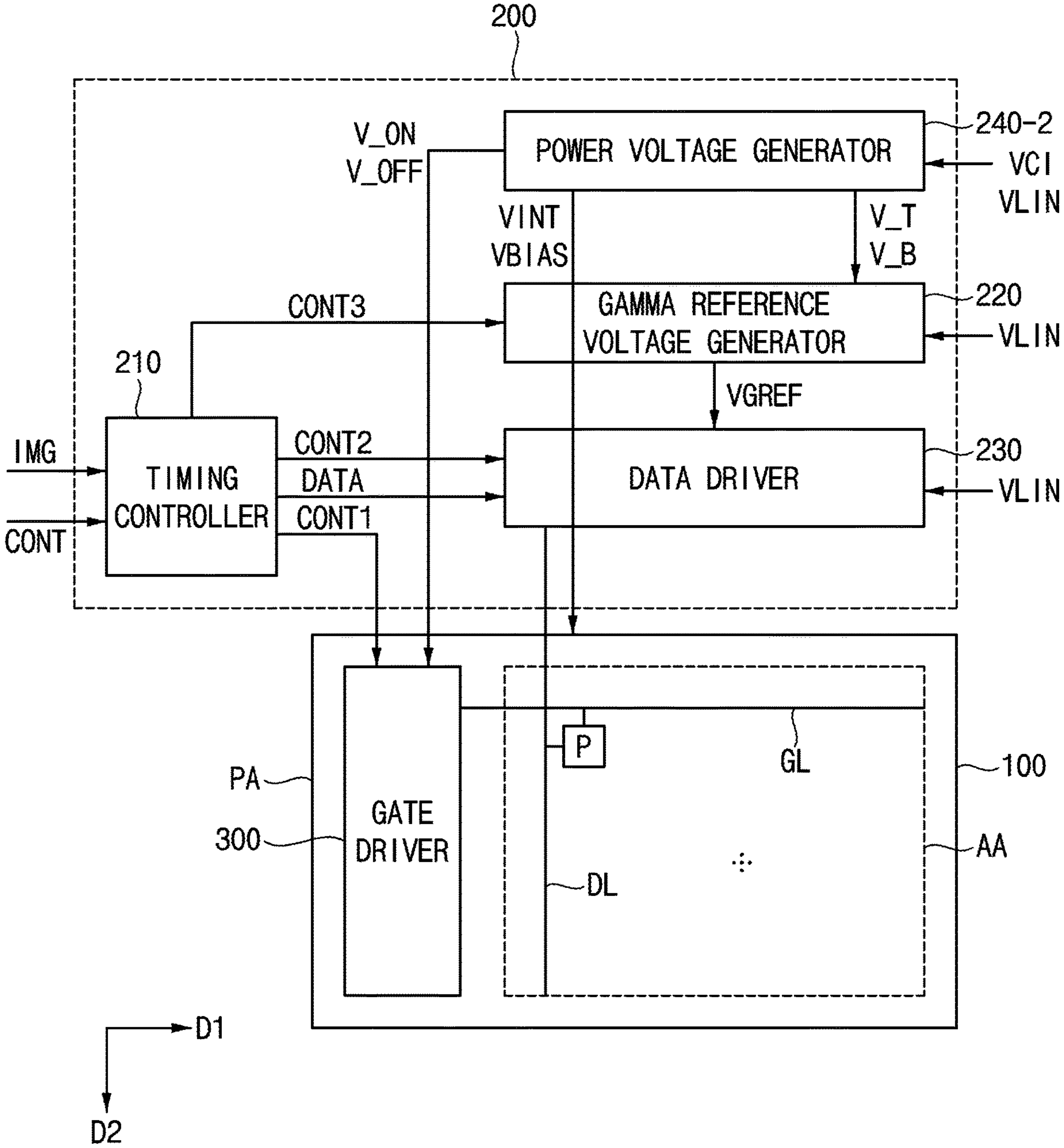
FIG. 4 is a block diagram showing a display device according to embodiments of the present disclosure.

FIG. 4 is a block diagram showing a display device according to embodiments of the present disclosure.

Since a display device according to the present embodiments has a configuration that is substantially identical to the configuration of the display device of FIG. 1 except for a second input voltage VCI, the same reference numerals and reference signs will be used for the same or similar components, and redundant descriptions will be omitted.

Referring to FIG. 4, a display device may include a display panel 100 and a driver IC 200. The driver IC 200 may include a timing controller 210, a gamma reference voltage generator 220, a data driver 230, and a power voltage generator 240-2.

Although the timing controller 210 and the power voltage generator 240-2 have been illustrated in the present embodiment as being integrated into the driver IC 200, the present disclosure is not limited thereto. For example, the timing controller 210 may be configured as a separate IC without being integrated into the driver IC 200. For example, the power voltage generator 240-2 may be configured as a separate IC without being integrated into the driver IC 200.

Figure 5:
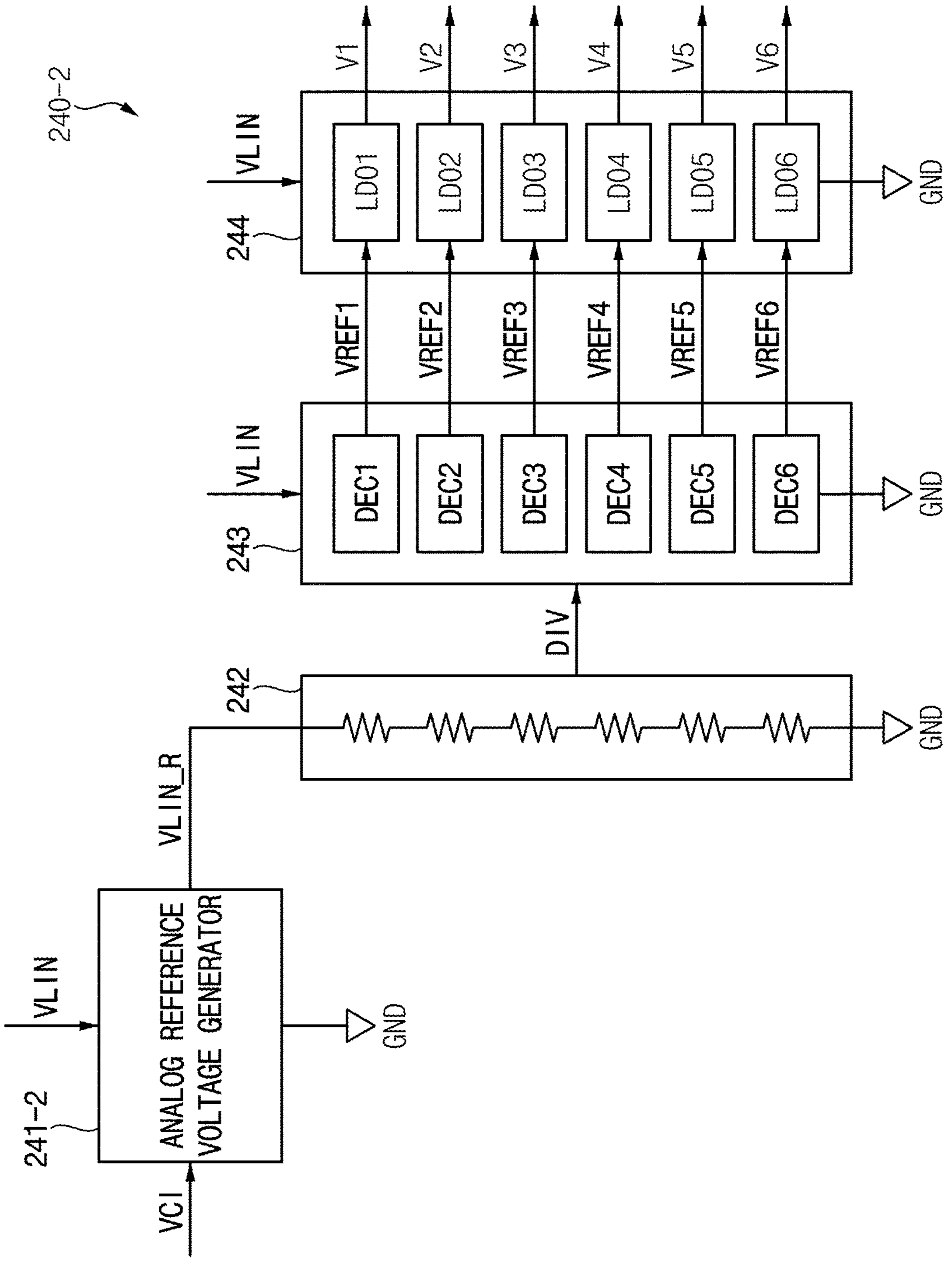
FIG. 5 is a view showing one example of a power voltage generator of FIG. 4.

FIG. 5 is a view showing one example of a power voltage generator 240-2 of FIG. 4.

Referring to FIGS. 4 and 5, the analog reference voltage generator 241-2 may generate the analog reference voltage VLIN_R based on the first input voltage VLIN and the second input voltage VCI. According to one embodiment, the second input voltage VCI may be generated from the power supply. The analog reference voltage generator 241-2 will be described in detail below.

According to one embodiment, the second input voltage VCI may be less than the first input voltage VLIN. For example, the first input voltage VLIN may be 7.3 V. For example, the second input voltage VCI may be 3 V.

Figure 6:
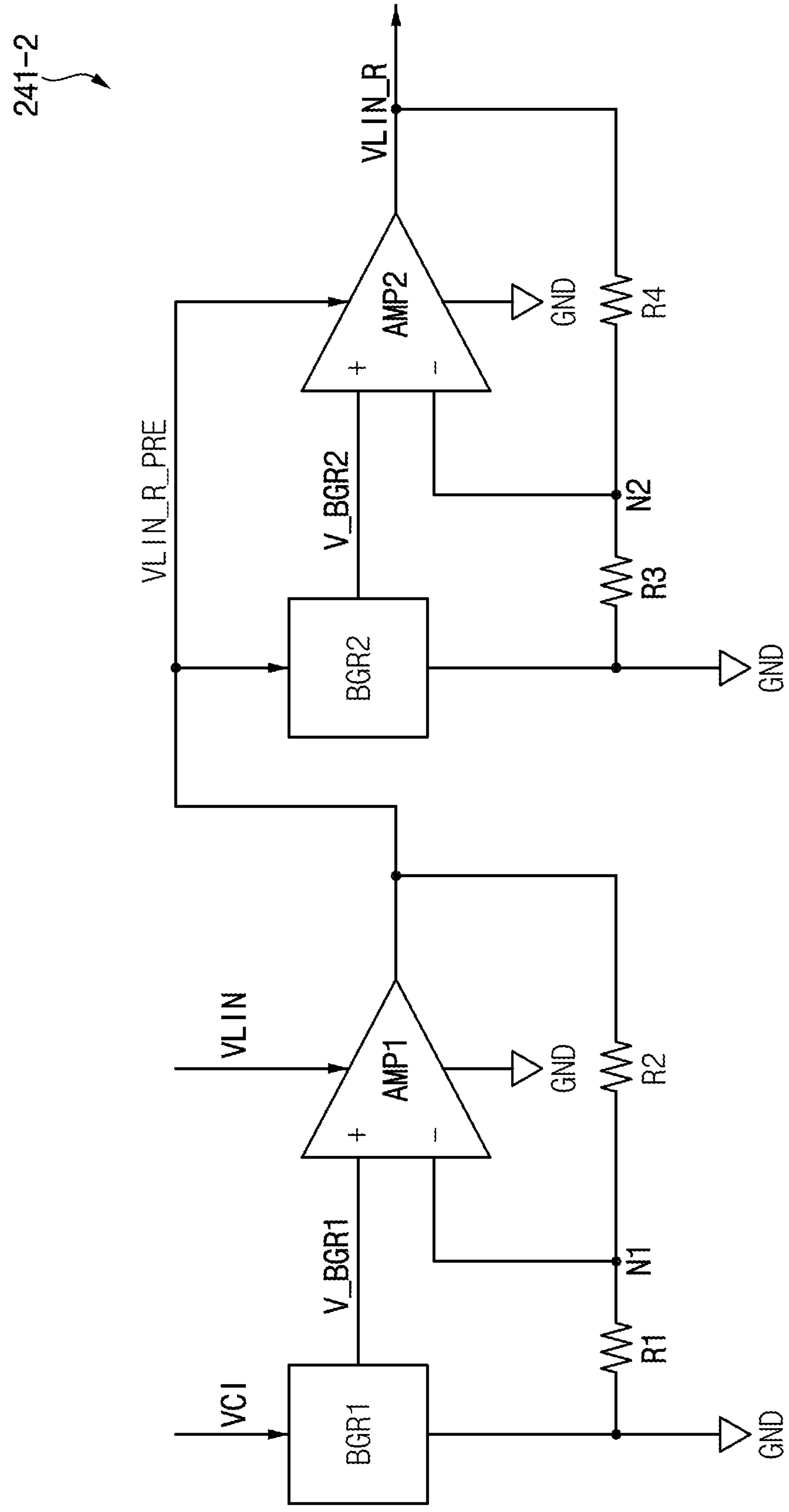
FIG. 6 is a view showing one example of an analog reference voltage generator of FIG. 5.

FIG. 6 is a view showing one example of an analog reference voltage generator 241-2 of FIG. 5.

Referring to FIGS. 4 to 6, the analog reference voltage generator 241-2 may include: a first bandgap reference voltage generator BGR1 configured to receive the second input voltage VCI to generate a first bandgap reference voltage V_BGR1; a first amplifier AMP1 including a first input terminal configured to receive the first bandgap reference voltage V_BGR1, a second input terminal connected to a first node N1, an output terminal configured to output a preliminary analog reference voltage VLIN_R_PRE, and a power terminal configured to receive a first input voltage VLIN; a first resistance element R1 including a first electrode connected to a ground GND and a second electrode connected to the first node N1; a second resistance element R2 including a first electrode connected to the first node N1 and a second electrode connected to the output terminal of the first amplifier AMP1; a second bandgap reference voltage generator BGR2 configured to receive the preliminary analog reference voltage VLIN_R_PRE to generate a second bandgap reference voltage V_BGR2; a second amplifier AMP2 including a first input terminal configured to receive the second bandgap reference voltage V_BGR2, a second input terminal connected to a second node N2, and an output terminal configured to output the analog reference voltage VLIN_R; a third resistance element R3 including a first electrode connected to the ground GND and a second electrode connected to the second node N2; and a fourth resistance element R4 including a first electrode connected to the second node N2 and a second electrode connected to the output terminal of the second amplifier AMP2.

The first bandgap reference voltage V_BGR1 may be a voltage corresponding to the second input voltage VCI. A voltage of the first node N1 may be a voltage corresponding to the first bandgap reference voltage V_BGR1. In addition, the preliminary analog reference voltage VLIN_R_PRE may be determined by the first bandgap reference voltage V_BGR1 and resistances of the first and second resistance elements R1 and R2.

The first amplifier AMP1 may further include a power terminal configured to receive the first input voltage VLIN. Therefore, the preliminary analog reference voltage VLIN_R_PRE may be less than or equal to the first input voltage VLIN.

The second bandgap reference voltage V_BGR2 may be a voltage corresponding to the preliminary analog reference voltage VLIN_R_PRE. A voltage of the second node N2 may be a voltage corresponding to the second bandgap reference voltage V_BGR2. In addition, the analog reference voltage VLIN_R may be determined by the second bandgap reference voltage V_BGR2 and resistances of the third and fourth resistance elements R3 and R4.

The second amplifier AMP2 may further include a power terminal configured to receive the preliminary analog reference voltage VLIN_R_PRE. Therefore, the analog reference voltage VLIN_R may be less than or equal to the preliminary analog reference voltage VLIN_R_PRE.

The analog reference voltage VLIN_R may have a higher voltage level in a case where an input voltage (e.g., the first input voltage VLIN) having a high voltage level (e.g., 7.3 V) is applied to the power terminal of the first amplifier AMP1 as compared with a case where an input voltage (e.g., the second input voltage VCI) having a low voltage level (e.g., 3 V) is applied to the power terminal of the first amplifier AMP1. Since the analog reference voltage VLIN_R has a high voltage level, the reference voltages VREF1, VREF2, VREF3, VREF4, VREF5, and VREF6 may also have high voltage levels. In addition, since the driving voltages V1, V2, V3, V4, V5, and V6 that are required are not changed, voltage gains of the regulators LDO1, LDO2, LDO3, LDO4, LDO5, and LDO6 may be reduced. Therefore, the power voltage generator 240-2 may increase the voltage levels of the reference voltages VREF1, VREF2, VREF3, VREF4, VREF5, and VREF6 applied to the regulators LDO1, LDO2, LDO3, LDO4, LDO5, and LDO6 and reduce the voltage gains of the regulators LDO1, LDO2, LDO3, LDO4, LDO5, and LDO6, so that an influence of noise on outputs of the regulators LDO1, LDO2, LDO3, LDO4, LDO5, and LDO6 may be reduced. In other words, noise characteristics of the regulators LDO1, LDO2, LDO3, LDO4, LDO5, and LDO6 may be improved.

Figure 7:
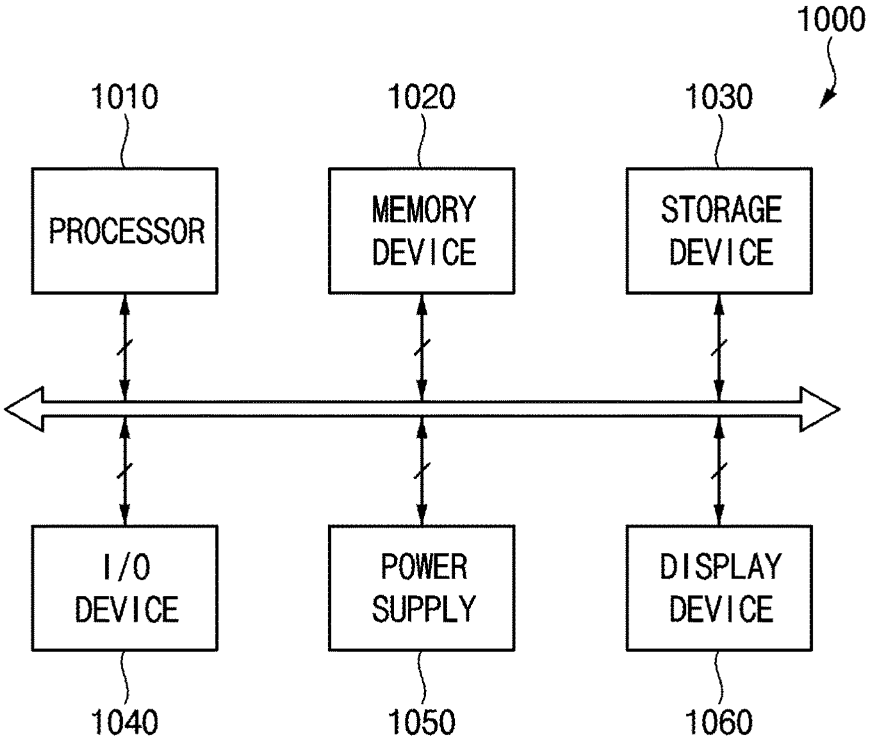
FIG. 7 is a block diagram showing an electronic device according to embodiments of the present disclosure.
Figure 8:
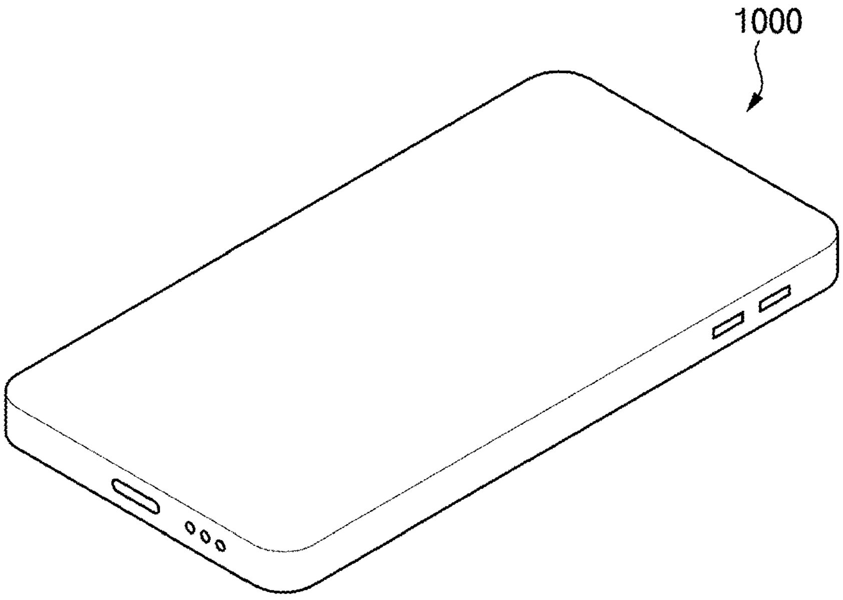
FIG. 8 is a diagram showing one example in which the electronic device of FIG. 7 is implemented as a smart phone.

FIG. 7 is a block diagram showing an electronic device 1000 according to embodiments of the present disclosure, and FIG. 8 is a diagram showing one example in which the electronic device 1000 of FIG. 7 is implemented as a smart phone.

Referring to FIGS. 7 and 8, the electronic device 1000 may include a processor 1010, a memory device 1020, a storage device 1030, an input/output (I/O) device 1040, a power supply 1050, and a display device 1060. Here, the display device 1060 may be the display device of FIG. 1. In addition, the electronic device 1000 may further include a plurality of ports for communicating with a video card, a sound card, a memory card, a universal serial bus (USB) device, other electronic devices, etc. In an embodiment, as shown in FIG. 8, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, etc.

The processor 1010 may perform various computing functions. The processor 1010 may be a micro processor, a central processing unit (CPU), an application processor (AP), etc. The processor 1010 may be coupled to other components via an address bus, a control bus, a data bus, etc. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc and/or at least one volatile memory device such as a dynamic random access memory (DRAM) device, a static random access memory (SRAM) device, a mobile DRAM device, etc.

The storage device 1030 may include a solid state drive (SSD) device, a hard disk drive (HDD) device, a CD-ROM device, etc.

The I/O device 1040 may include an input device such as a keyboard, a keypad, a mouse device, a touch-pad, a touch-screen, etc, and an output device such as a printer, a speaker, etc. In some embodiments, the I/O device 1040 may include the display device 1060.

The power supply 1050 may provide power for operations of the electronic device 1000. For example, the power supply 1050 may be a power management integrated circuit (PMIC).

The display device 1060 may display an image corresponding to visual information of the electronic device 1000. Here, the display device 1060 may be an organic light emitting display device or a quantum-dot light emitting display device. However, the display device 1060 is not limited thereto. The display device 1060 may be coupled to other components via the buses or other communication links. The display device 1060 may increase voltage levels of reference voltages applied to regulators and reduce voltage gains of the regulators, so that an influence of noise on outputs of the regulators may be reduced.

The present disclosure may be applied to a display device and an electronic device including the display device. For example, the present disclosure may be applied to a digital television, a 3D television, a smart phone, a cellular phone, a personal computer (PC), a tablet PC, a virtual reality (VR) device, a home appliance, a laptop, a personal digital assistant (PDA), a portable media player (PMP), a digital camera, a music player, a portable game console, a car navigation system, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A power voltage generator comprising:

an analog reference voltage generator configured to generate an analog reference voltage based on a first input voltage;

a resistance string configured to generate distribution voltages by performing voltage distribution on the analog reference voltage;

a decoding unit configured to generate reference voltages by decoding the distribution voltages;

a regulator unit configured to generate driving voltages based on the reference voltages and supply at least one of the driving voltages to a gamma reference voltage generator to generate a gamma reference voltage.

2. The power voltage generator of claim 1, wherein the analog reference voltage generator includes:

a first bandgap reference voltage generator configured to receive the first input voltage to generate a first bandgap reference voltage;

a first amplifier including a first input terminal configured to receive the first bandgap reference voltage, a second input terminal connected to a first node, and an output terminal configured to output a preliminary analog reference voltage;

a first resistance element including a first electrode connected to a ground and a second electrode connected to the first node;

a second resistance element including a first electrode connected to the first node and a second electrode connected to the output terminal of the first amplifier;

a second bandgap reference voltage generator configured to receive the preliminary analog reference voltage to generate a second bandgap reference voltage;

a second amplifier including a first input terminal configured to receive the second bandgap reference voltage, a second input terminal connected to a second node, and an output terminal configured to output the analog reference voltage;

a third resistance element including a first electrode connected to the ground and a second electrode connected to the second node; and a fourth resistance element including a first electrode connected to the second node and a second electrode connected to the output terminal of the second amplifier.

3. The power voltage generator of claim 2, wherein the first amplifier further includes a power terminal configured to receive the first input voltage.

4. The power voltage generator of claim 2, wherein the second amplifier further includes a power terminal configured to receive the preliminary analog reference voltage.

5. The power voltage generator of claim 1, wherein the analog reference voltage generator is configured to generate the analog reference voltage based on the first input voltage and a second input voltage that is smaller than the first input voltage.

6. The power voltage generator of claim 5, wherein the analog reference voltage generator includes:

a first bandgap reference voltage generator configured to receive the second input voltage to generate a first bandgap reference voltage;

a first amplifier including a first input terminal configured to receive the first bandgap reference voltage, a second input terminal connected to a first node, an output terminal configured to output a preliminary analog reference voltage, and a power terminal configured to receive the first input voltage;

a first resistance element including a first electrode connected to a ground and a second electrode connected to the first node;

a second resistance element including a first electrode connected to the first node and a second electrode connected to the output terminal of the first amplifier;

a second bandgap reference voltage generator configured to receive the preliminary analog reference voltage to generate a second bandgap reference voltage;

a second amplifier including a first input terminal configured to receive the second bandgap reference voltage, a second input terminal connected to a second node, and an output terminal configured to output the analog reference voltage;

a third resistance element including a first electrode connected to the ground and a second electrode connected to the second node; and a fourth resistance element including a first electrode connected to the second node and a second electrode connected to the output terminal of the second amplifier.

7. The power voltage generator of claim 6, wherein the second amplifier further includes a power terminal configured to receive the preliminary analog reference voltage.

8. A driver integrated circuit (IC) comprising:

a power voltage generator configured to generate driving voltages;

a gamma reference voltage generator configured to receive at least one of the driving voltages to generate a gamma reference voltage; and a data driver configured to generate data voltages based on the gamma reference voltage, wherein the power voltage generator includes:

an analog reference voltage generator configured to generate an analog reference voltage based on a first input voltage for driving at least one of the data driver and the gamma reference voltage generator;

a resistance string configured to generate distribution voltages by performing voltage distribution on the analog reference voltage;

a decoding unit configured to generate reference voltages by decoding the distribution voltages; and a regulator unit configured to generate the driving voltages based on the reference voltages and supply at least one of the driving voltages to the gamma reference voltage generator to generate the gamma reference voltage.

9. The driver IC of claim 8, wherein the analog reference voltage generator includes:

a first bandgap reference voltage generator configured to receive the first input voltage to generate a first bandgap reference voltage;

a first amplifier including a first input terminal configured to receive the first bandgap reference voltage, a second input terminal connected to a first node, and an output terminal configured to output a preliminary analog reference voltage;

a first resistance element including a first electrode connected to a ground and a second electrode connected to the first node;

a second resistance element including a first electrode connected to the first node and a second electrode connected to the output terminal of the first amplifier;

a second bandgap reference voltage generator configured to receive the preliminary analog reference voltage to generate a second bandgap reference voltage;

a second amplifier including a first input terminal configured to receive the second bandgap reference voltage, a second input terminal connected to a second node, and an output terminal configured to output the analog reference voltage;

a third resistance element including a first electrode connected to the ground and a second electrode connected to the second node; and a fourth resistance element including a first electrode connected to the second node and a second electrode connected to the output terminal of the second amplifier.

10. The driver IC of claim 9, wherein the first amplifier further includes a power terminal configured to receive the first input voltage, and wherein the second amplifier further includes a power terminal configured to receive the preliminary analog reference voltage.

11. The driver IC of claim 8, wherein the analog reference voltage generator is configured to generate the analog reference voltage based on the first input voltage and a second input voltage that is smaller than the first input voltage.

12. The driver IC of claim 11, wherein the analog reference voltage generator includes:

a first bandgap reference voltage generator configured to receive the second input voltage to generate a first bandgap reference voltage;

a first amplifier including a first input terminal configured to receive the first bandgap reference voltage, a second input terminal connected to a first node, an output terminal configured to output a preliminary analog reference voltage, and a power terminal configured to receive the first input voltage;

a first resistance element including a first electrode connected to a ground and a second electrode connected to the first node;

a second resistance element including a first electrode connected to the first node and a second electrode connected to the output terminal of the first amplifier;

a second bandgap reference voltage generator configured to receive the preliminary analog reference voltage to generate a second bandgap reference voltage;

a second amplifier including a first input terminal configured to receive the second bandgap reference voltage, a second input terminal connected to a second node, and an output terminal configured to output the analog reference voltage;

a third resistance element including a first electrode connected to the ground and a second electrode connected to the second node; and a fourth resistance element including a first electrode connected to the second node and a second electrode connected to the output terminal of the second amplifier.

13. The driver IC of claim 8, further comprising:

a timing controller configured to control the data driver and the gamma reference voltage generator.

14. A display device comprising:

a display panel including pixels to which at least one of driving voltages is input;

a gate driver configured to apply gate signals to the pixels; and a driver integrated circuit (IC) configured to generate the driving voltages and to apply data voltages to the pixels, wherein the driver IC includes:

a power voltage generator configured to generate the driving voltages;

a gamma reference voltage generator configured to generate a gamma reference voltage; and a data driver configured to generate the data voltages based on the gamma reference voltage, and wherein the power voltage generator includes:

an analog reference voltage generator configured to generate an analog reference voltage based on a first input voltage for driving at least one of the data driver and the gamma reference voltage generator;

resistance string configured to generate distribution voltages by performing voltage distribution on the analog reference voltage;

a decoding unit configured to generate reference voltages by decoding the distribution voltages; and a regulator unit configured to generate the driving voltages based on the reference voltages and supply at least one of the driving voltages to the gamma reference voltage generator to generate the gamma reference voltage.

15. The display device of claim 14, wherein the gate driver is configured to receive at least one of the driving voltages to generate the gate signals.

16. The display device of claim 14, wherein the analog reference voltage generator includes:

a first bandgap reference voltage generator configured to receive the first input voltage to generate a first bandgap reference voltage;

a first amplifier including a first input terminal configured to receive the first bandgap reference voltage, a second input terminal connected to a first node, and an output terminal configured to output a preliminary analog reference voltage;

a first resistance element including a first electrode connected to a ground and a second electrode connected to the first node;

a second resistance element including a first electrode connected to the first node and a second electrode connected to the output terminal of the first amplifier;

a second bandgap reference voltage generator configured to receive the preliminary analog reference voltage to generate a second bandgap reference voltage;

a second amplifier including a first input terminal configured to receive the second bandgap reference voltage, a second input terminal connected to a second node, and an output terminal configured to output the analog reference voltage;

a third resistance element including a first electrode connected to the ground and a second electrode connected to the second node; and a fourth resistance element including a first electrode connected to the second node and a second electrode connected to the output terminal of the second amplifier.

17. The display device of claim 14, wherein the analog reference voltage generator is configured to generate the analog reference voltage based on the first input voltage and a second input voltage that is smaller than the first input voltage.

18. The display device of claim 17, wherein the analog reference voltage generator includes:

a first bandgap reference voltage generator configured to receive the second input voltage to generate a first bandgap reference voltage;

a first amplifier including a first input terminal configured to receive the first bandgap reference voltage, a second input terminal connected to a first node, an output terminal configured to output a preliminary analog reference voltage, and a power terminal configured to receive the first input voltage;

a first resistance element including a first electrode connected to a ground and a second electrode connected to the first node;

a second resistance element including a first electrode connected to the first node and a second electrode connected to the output terminal of the first amplifier;

a second bandgap reference voltage generator configured to receive the preliminary analog reference voltage to generate a second bandgap reference voltage;

a second amplifier including a first input terminal configured to receive the second bandgap reference voltage, a second input terminal connected to a second node, and an output terminal configured to output the analog reference voltage;

a third resistance element including a first electrode connected to the ground and a second electrode connected to the second node; and a fourth resistance element including a first electrode connected to the second node and a second electrode connected to the output terminal of the second amplifier.

19. The display device of claim 14, further comprising:

a timing controller configured to control the gate driver, the data driver, and the gamma reference voltage generator.

20. The display device of claim 19, wherein the timing controller is integrated into the driver IC.

* * * * *